United States Patent
El Nahas El Homsi

(10) Patent No.: US 7,123,942 B2
(45) Date of Patent: Oct. 17, 2006

(54) RADIO STATION WITH CLOSED-LOOP TRANSMISSION DIVERSITY, AND PROCESS FOR CONTROLLING TRANSMISSION FROM SUCH A STATION

(75) Inventor: Hassan El Nahas El Homsi, Paris (FR)

(73) Assignee: Nortel Networks Limited, St. Laurent (CA)

( * ) Notice: Subject to any disclaimer, the term of this patent is extended or adjusted under 35 U.S.C. 154(b) by 788 days.

(21) Appl. No.: 10/200,627

(22) Filed: Jul. 23, 2002

(65) Prior Publication Data

US 2003/0022695 A1 Jan. 30, 2003

(30) Foreign Application Priority Data

Jul. 25, 2001 (FR) ................................. 01 09928

(51) Int. Cl.
*H04Q 7/30* (2006.01)
(52) U.S. Cl. .................... 455/562.1; 455/522; 455/101; 455/69
(58) Field of Classification Search ............. 455/562.1, 455/561, 522, 101, 67.11, 16, 69, 63.1, 137, 455/136; 375/347, 267, 249, 346, 146, 260, 375/295, 299, 315; 370/334
See application file for complete search history.

(56) References Cited

U.S. PATENT DOCUMENTS 5,886,988 A * 3/1999 Yun et al. .................... 370/329
6,067,324 A 5/2000 Harrison
6,842,632 B1 * 1/2005 Raghothaman et al. .. 455/562.1
6,853,839 B1 * 2/2005 Usuda et al. ........... 455/522 X

FOREIGN PATENT DOCUMENTS

EP 1 117 197 7/2001
WO WO 01 35548 5/2001

OTHER PUBLICATIONS

Raghothaman et al., <<Transmit Adaptive Array Without User-Specific Pilot for 3G CDMA >>, IEEE, vol. 5 of 6, Jul. 2000, pp. 3009-3012.
<< 3rd Generation Partnership Project; Technical Specification Group Radio Access Network; Physical Layer Procedures (FDD) (RELEASE 1999) >>, 3GPP TS 25.214, V3.6.0 (Mar. 2001).

(Continued)

*Primary Examiner*—Matthew D. Anderson
*Assistant Examiner*—Philip J. Sobutka
(74) *Attorney, Agent, or Firm*—Trop, Pruner & Hu, P.C.

(57) ABSTRACT

A base station having N transmission antennas (15) broadcasts M beacon signals (CPICH0, CPICH1), with 1<M<N. Each beacon signal is associated with a distribution vector (a, b) with N components and is applied to each of the antennas after weighting by a component of this vector. A mobile terminal in communication with the base station evaluates the reception of the M beacon signals so as to determine feedback data communicated to the base station. The latter causes the distribution vectors associated with the M beacons to vary over time, and processes the feedback data successively received so as to determine a respective weighting coefficient ($w_0$–$w_3$) for each of the N antennas relative to the mobile terminal. A transmitted dedicated radio signal destined for the mobile terminal is applied to each of the N transmission antennas after weighting by the coefficient determined for this antenna.

12 Claims, 2 Drawing Sheets

OTHER PUBLICATIONS

<< 3rd Generation Partnership Project; Technical Specification Group Radio Access Network; Physical Channels and Mapping of Transport Channels onto Physical Channels (FDD) (RELEASE 1999) >>, 3G TS 25.211, V3.3.0 (Jun. 2000).

* cited by examiner

RADIO STATION WITH CLOSED-LOOP TRANSMISSION DIVERSITY, AND PROCESS FOR CONTROLLING TRANSMISSION FROM SUCH A STATION

BACKGROUND OF THE INVENTION

The present invention relates to transmission diversity methods used in certain radio communication systems.

In these methods, one and the same radio signal is transmitted under different conditions by several antennas of the transmitting station, thereby improving the detection of the signal by the receiver, in particular by rendering it less sensitive to channel fading. This results in better spectral efficiency of the system.

The invention is more especially concerned with so-called closed-loop transmission diversity methods, in which the transmission parameters of the signal on the various antennas are determined from feedback data which are returned by the remote receiving station and depend on the quality of reception of the radio waves. In general, these feedback data are calculated from the estimated impulse responses corresponding to the propagation channels relating to the various antennas. The transmitting station then applies a phase shift to each antenna, so that the signals of the various antennas reach the receiving station approximately in phase.

Closed-loop transmission diversity offers a significant gain, provided that the feedback data are sent back and applied fairly rapidly. This assumes that the variations of the propagation channels are not too rapid.

A closed-loop transmission diversity method such as this is in particular envisaged in the third-generation cellular networks of the UMTS type ("Universal Mobile Telecommunications System"). A detailed description thereof is given in section 7 of the technical specification 3G TS 25.214, "Physical layer procedures (FDD)—Release 1999", version 3.6.0, published in March 2001 by the 3GPP ("$3^{rd}$ Generation Partnership Project").

A base station of such a network can have two antennas for one and the same cell and via which it broadcasts respectively two distinct beacon signals on common channels referred to as CPICHs ("Common Pilot Channels"). When the closed-loop transmission diversity is activated in respect of a mobile terminal communicating within the cell, this terminal detects the impulse responses $h_0$, $h_1$ individual to the two antennas on the basis of these a priori known beacon signals, and determines an optimal normalized vector g which maximizes the quantity $g^H.K.g$, where K is the covariance matrix of the impulse responses, of the form $$K = \begin{bmatrix} h_0^H \cdot h_0 & h_0^H \cdot h_1 \\ h_1^H \cdot h_0 & h_1^H \cdot h_1 \end{bmatrix}, (.)^H$$

denoting the conjugate transpose. The direction of this optimal vector g is indicated to the base station in an uplink signalling channel. The base station applies corresponding weighting coefficients (phase and/or amplitude) in respect of the transmission by the two antennas of the dedicated signals destined for the mobile terminal in question.

In principle, the gain afforded by a closed-loop transmission diversity method such as this can be increased by equipping the base stations with more than two transmission antennas and by providing a corresponding number of beacon signals for the estimation of the impulse responses by the mobiles. However, the multiplying up of the beacon signals may be undesirable since it increases the general level of interference, given that these beacon signals are transmitted at relatively high power so as to be detected reliably in the entire cell.

Moreover, a cellular operator cannot extend the method in this manner to more than two antennas if the mobile terminals and the radio signalling interface are not modified accordingly. However, such a modification is generally outside the control of the operator.

An aim of the present invention is nevertheless to make it possible to implement a closed-loop transmission diversity method with N>M transmission antennas when the destination stations take only M beacon signals into account.

SUMMARY OF THE INVENTION

The invention thus proposes a method for controlling transmission from a first radio station having N transmission antennas to a second radio station, N being a number larger than 2, comprising the following steps:

broadcasting M beacon signals (CPICH0, CPICH1) from the first station, M being a number larger than 1 and smaller than N, each beacon signal being associated with a distribution vector (a, b) with N components and being applied to each of the N antennas after weighting by a corresponding component of the associated distributor vector;

evaluating the reception of the M beacon signals by the second station, so as to determine feedback data communicated to the first station;

causing the distribution vectors associated with the M beacon signals to vary over time;

processing the feedback data successively received by the first station so as to determine a respective weighting coefficient ($w_0$–$w_3$) for each of the N antennas; and transmitting a dedicated radio signal from the first station destined for the second station, the said dedicated signal being applied to each of the N transmission antennas after weighting by the coefficient determined for the said antenna.

The first station distributes the M beacon signals over the N antennas and causes this distribution to vary over time. This procedure is transparent to the second station which behaves as if the first station had only M antennas, by evaluating M impulse responses and by returning corresponding feedback data. When the distribution varies, the first station recovers information on different combinations of the pilot channels which, after a certain number of combinations, enables it to obtain some idea as to the optimal weighting coefficients to be applied to the N antennas.

In particular, the processing of the feedback data may comprise an estimation of a matrix with N rows and N columns on the basis of feedback data obtained for several combinations of distribution vectors, the term situated in the (i+1)-th and in the (j+1)-th column of the said matrix, for $0 \leq i < N$ and $0 \leq j < N$, being proportional to $h'^H_j.h'_i$, where $h'_i$ denotes an impulse response of a propagation channel between the (i+1)-th transmission antenna of the first station and the second station. The processing can be continued via a calculation of an eigenvector corresponding to an eigenvalue of maximum modulus of the said matrix with N rows and N columns, the respective weighting coefficients for the N antennas being proportional to the components of the said eigenvector.

In the generality of the method, the distribution vectors may be arbitrary. It is however convenient to make provision for each distribution vector associated with a beacon signal to have a single nonzero component, this amounting to performing a rotation of the beacon signals on the transmission antennas.

Another aspect of the present invention pertains to a radio station with closed-loop transmission diversity, comprising N transmission antennas, N being a number larger than 1, and comprising:

means for broadcasting M beacon signals, M being a number larger than 1, said means for broadcasting comprising means for associating each of the M beacon signals with a respective distribution vector with N components, and means for applying each of the M beacon signals to each of the N antennas after weighting by a corresponding component of the associated distribution vector, means for transmitting at least one dedicated radio signal destined for a respective remote radio station, said means for transmitting the dedicated radio signal destined for a remote radio station comprising means for processing feedback data received from the said remote station so as to determine a respective weighting coefficient for each of the N antennas, and means for applying the said dedicated signal to each of the N transmission antennas after weighting by the coefficient determined for the said antenna, wherein N>M, wherein the broadcasting means furthermore comprise means for causing the distribution vectors associated with the M beacon signals to vary over time, and wherein the processing means are devised so as to determine the respective weighting coefficients for the N antennas on the basis of feedback data successively received for different combinations of distribution vectors.

DESCRIPTION OF PREFERRED EMBODIMENTS

The invention is described hereinbelow in an exemplary application to a UMTS cellular network in the particular case where N=4 and M=2.

UMTS networks use a wideband code division multiple access technique (W-CDMA). The symbols sent are multiplied by spreading codes consisting of samples referred to as "chips" whose rate (3.84 Mchip/s in the case of UMTS) is greater than that of the symbols sent. The spreading codes differentiate between various physical channels which are superimposed on the same transmission resource consisting of a carrier frequency. The auto- and cross-correlation properties of the spreading codes enable the receiver to separate the physical channels and to extract the symbols destined for it.

For UMTS in FDD mode ("Frequency Division Duplex") on the downlink, a scrambling code is allotted to each transceiver corresponding to a cell served by a base station, and various physical channels in this cell are differentiated via mutually orthogonal channel codes ("channelization codes"). The transceiver can also use several mutually orthogonal scrambling codes, one of them being a primary scrambling code. On the uplink, the transceiver uses the scrambling code to separate the transmitting mobile terminals, and optionally the channel code to separate the physical channels emanating from one and the same terminal. For each physical channel, the overall spreading code is the product of the channel code and of the scrambling code. The spreading factor (equal to the ratio of the chip rate to the symbol rate) is a power of 2 lying between 4 and 512. This factor is chosen as a function of the symbol throughput to be transmitted on the channel.

The physical channels comprise dedicated channels (DPCH, "Dedicated Physical Channel") and common channels.

In the downlink direction, the common channels comprise pilot channels (CPICH) on which beacon signals are transmitted. These beacon signals enable the mobile terminals to select the transceiver with which the radio link is of best quality. In the case where the closed-loop transmission diversity is implemented on the downlink, the pilot channels also enable the mobile terminals to determine the feedback information to be returned to the base station.

The structure of the beacon signal transmitted on a CPICH is described in section 5.3.1 of the technical specification 3G TS 25.211, version 3.3.0, "Physical Channels and Mapping of Transport Channels onto Physical Channels (FDD)—Release 1999", published in June 2000 by the 3GPP. The primary CPICH possesses a constant channel code equal to 1 and a spreading factor equal to 256.

Figure 1:
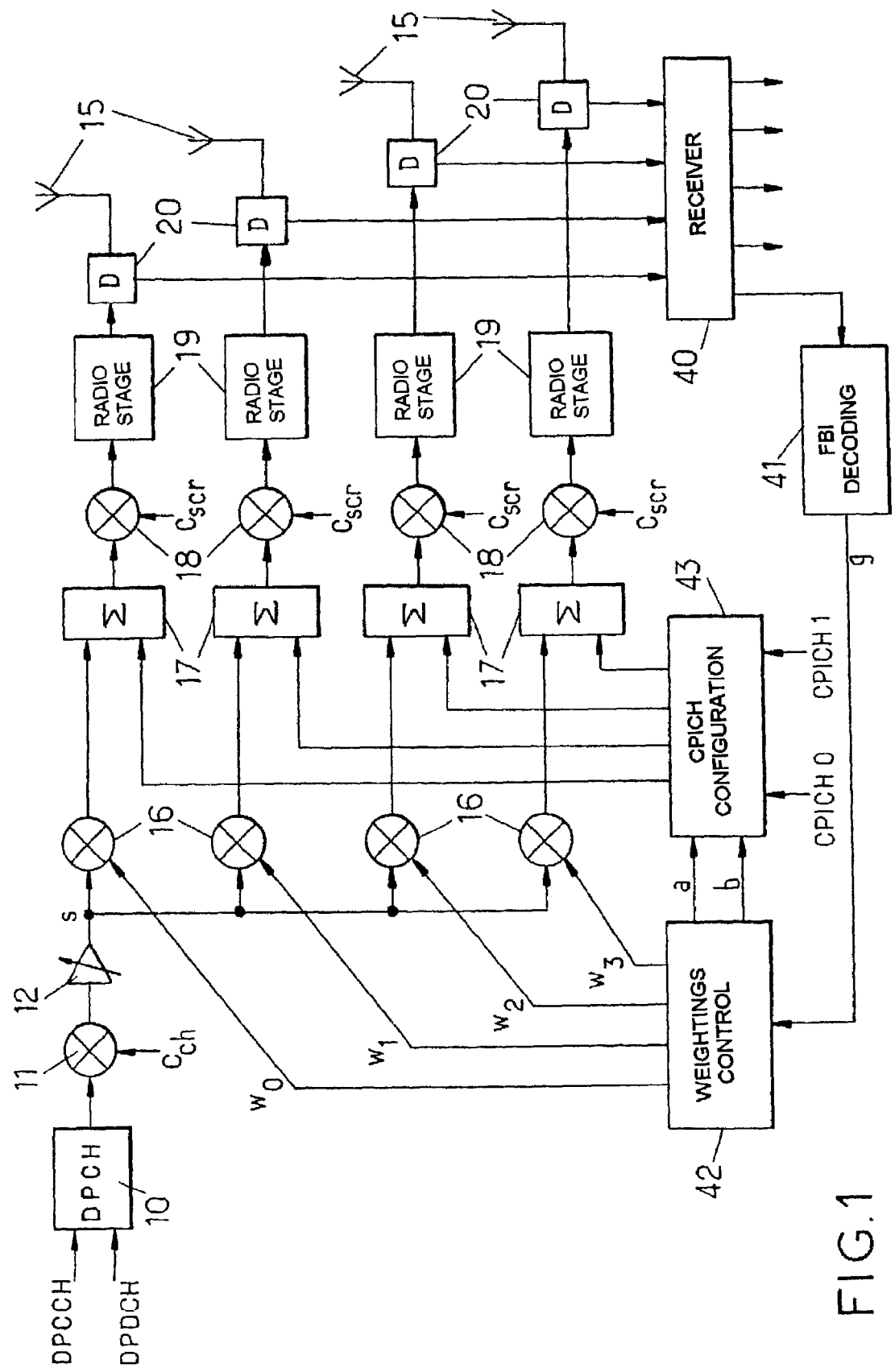
FIG. 1 is a schematic diagram of an exemplary base station according to the invention.

When the transmission diversity is implemented, the primary CPICH carries two beacon signals labelled CPICH0 and CPICH1 in FIG. 1. The beacon signal CPICH0 is composed of constant complex symbols equal to 1+j. The beacon signal CPICH1 is composed of a succession of pairs of complex symbols alternately equal to 1+j and to −1−j. These two signals are therefore orthogonal if they are observed over a duration covering sufficient symbols.

In FIG. 1, the reference 10 denotes a module which assembles the digital signal of a DPCH destined for a given mobile terminal from the symbols of a data subchannel (DPDCH, "Dedicated Physical Data Channel") and of a control subchannel (DPCCH, "Dedicated Physical Control Channel"). The sequence of complex symbols which emanates from the module 10 is modulated by the channel code $c_{ch}$ allotted to the DPCH by means of a multiplier 11. An amplifier with adjustable gain 12 multiplies the output from the multiplier 11 by a power factor, determined in a manner known per se by a power control procedure. The resulting complex signal s, which constitutes the contribution of the DPCH to the signal transmitted in the cell by the base station, is allocated to N=4 pathways so as to be transmitted by way of the four antennas 15 of the base station.

On each pathway i ($0 \leq i < N$), a complex multiplier 16 weights the dedicated signal s by a coefficient $w_i$. The weighted signal is applied to an input of a summator 17 which adds together the contributions of the various channels destined for the antenna 15 of the pathway. These contributions comprise those from the other DPCHs (not represented), as well as the contributions of the common channels, in particular the CPICH. Another multiplier 18 modulates the output from the summator 17 by the scrambling code $c_{scr}$ of the cell. Each of the N=4 pathways furthermore comprises a radio stage 19 which effects the conventional operations of filtering, conversion to analogue, transposition to the radio frequency and amplification. The resulting radio signal is applied to the antenna 15 of the pathway by way of the duplexer 20.

Figure 2:
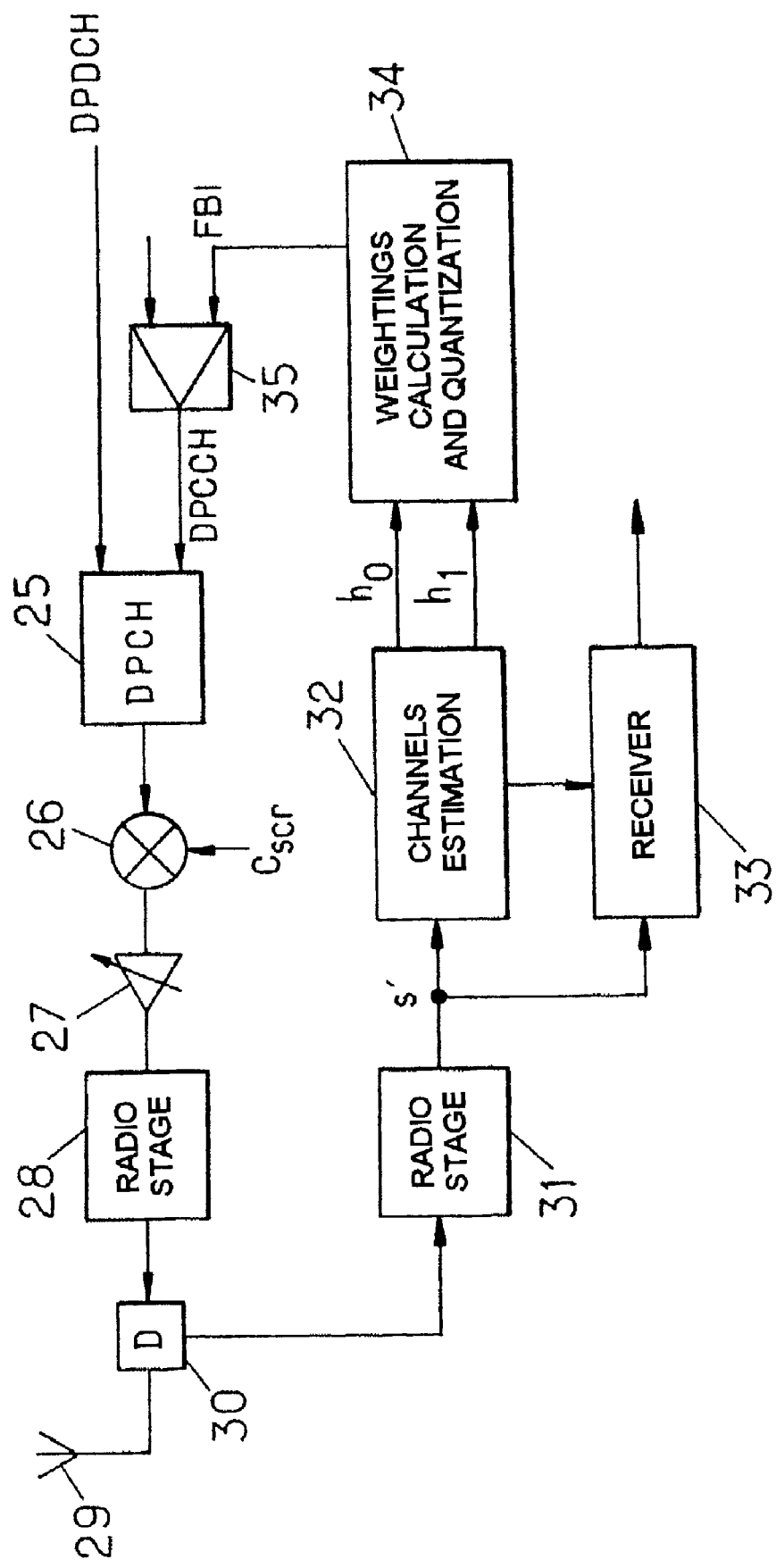
FIG. 2 is a schematic diagram of a mobile terminal co-operating with such a base station.

FIG. 2 shows the transmission part of a UMTS mobile terminal transmitting down a single DPCH. The module 25 assembles the complex digital signal relating to this DPCH from the symbols supplied on the data subchannel DPDCH and control subchannel DPCCH. This digital signal is modulated by a scrambling code $c_{scr}$ by means of the multiplier 26. The amplifier 27 applies the gain determined by the power control procedure to the uplink, and the radio station 28 shapes the radio signal supplied to the antenna 29 of the terminal by way of the duplexer 30.

In the reception direction, the mobile terminal has a radio stage 31 which effects the amplification, frequency transposition, filtering and digitization processing so as to form a base band signal s' from the radio signal picked up by the antenna 29. The base band signal s' is probed by a module 32 serving to estimate the impulse responses of the downlink channels relevant to the mobile terminal. These estimated impulse responses enable the receiver 33, which may conventionally be of the "rake" type, to recover the signals destined for the mobile terminal.

To estimate an impulse response, the probing module 32 comprises, in a conventional manner, a filter matched to the spreading code of the relevant channel (product of the channel code and of the scrambling code). During reception of a pilot symbol, known a priori to the mobile terminal, the output of this matched filter is multiplied by the conjugate complex of this pilot symbol, thereby producing an observation of the impulse response, represented by a vector of dimension L, where L is the length considered, expressed as a number of chips, for the impulse responses. The estimation is obtained by averaging these observations over a few tens of pilot symbols. In the case of dedicated channels, the pilot symbols form part of the DPCCH.

For the CPICHs, the signals transmitted are composed only of pilot symbols. When the closed-loop transmission diversity mode is activated in a cell for the mobile terminal, the orthogonality of the beacon signals CPICH0 and CPICH1 enables the module 32 of the terminal to estimate separately the impulse response vector $h_0$ corresponding to the signal CPICH0 and the impulse response vector $h_1$ corresponding to the signal CPICH1.

On the basis of these M=2 estimated impulse responses $h_0$, $h_1$, a module 34 calculates the normalized weighting vector g which maximizes the quantity $g^H.K.g.$, where K is the covariance matrix of the impulse responses, given by $$K = \begin{bmatrix} h_0^H \cdot h_0 & h_0^H \cdot h_1 \\ h_1^H \cdot h_0 & h_1^H \cdot h_1 \end{bmatrix}.$$

This vector g corresponds to the normalized eigenvector of the matrix K which is associated with its eigenvalue of largest modulus. The module 34 does not necessarily perform the diagonalization of the matrix K, given the quantization to which the vector g is subject. In the current state of the standard (see the aforesaid specification 3G TS 25.214), this quantization is carried out on four bits, so that the module 34 merely needs to test sixteen possibilities for the quantized vector g and to select the one which maximizes quantity $g^H.K.g$.

The quantization bits of the vector g are supplied to a module 35 so as to be inserted into the FBI fields ("Feedback Information") of the uplink subchannel DPCCH. The subfield D of the field FBI, which occupies one bit every timeslot of 666 μs serves to transmit these quantization bits (see section 5.2.1 of the aforesaid technical specification 3G TS 25.211). The time required to send back the feedback data, describing a vector g selected by the module 34, is therefore 2.666 ms.

Coming back to FIG. 1, the reception part 40 of the transceiver of the base station detects the signals transmitted on the various uplink channels, and in particular supplies a module 41 with the successive bits of the subfield FBI-D of the uplink DPCCH. The module 41 decodes the bits FBI to obtain the quantized weighting vectors g of dimension M=2 which are determined successively at the mobile terminal level.

The base station has a module for controlling the weightings 42 which processes the successive vectors g recovered by the decoder 41 so as to calculate the complex weighting coefficients $w_0$–$w_3$ respectively destined for the transmission of the dedicated signal s by way of the N=4 antennas 15. The module 42 also causes the distribution of the M=2 beacon signals CPICH0, CPICH1 to vary by controlling a module 43 for configuration of the CPICH.

To do this, the control module supplies the configuration module M distribution vectors of dimension N, respectively associated with the M beacon signals. In the case considered where M=2, the distribution vector $$a = \begin{bmatrix} a_0 \\ a_1 \\ a_2 \\ a_3 \end{bmatrix}$$

is associated with the signal CPICH0, and the distribution vector $$b = \begin{bmatrix} b_0 \\ b_1 \\ b_2 \\ b_3 \end{bmatrix}$$

is associated with the signal CPICH1, so that the contribution of the CPICH despatched by the configuration module 43 to the summator 17 of pathway i is equal to P.($a_i$.CPICH0+$b_i$.CPICH1), where P is a gain determined by the transmission power required on the CPICH.

The control module 42 causes the vectors a and b to vary over time by modifying them for example every 10 to 30 ms. It then processes the vectors g recovered for the various combinations (a, b) so as to evaluate the optimal weighting coefficients $w_i$.

These coefficients $w_i$ are the components of the normalized eigenvector $$W = \begin{bmatrix} w_0 \\ w_1 \\ w_2 \\ w_3 \end{bmatrix}$$

associated with the eigenvalue of maximum modulus of the covariance matrix $$K = H'^H \cdot H' = \begin{bmatrix} k'_{00} & k'_{01} & k'_{02} & k'_{03} \\ k'_{10} & k'_{11} & k'_{12} & k'_{13} \\ k'_{20} & k'_{21} & k'_{22} & k'_{23} \\ k'_{30} & k'_{31} & k'_{32} & k'_{33} \end{bmatrix},$$

where $H'=[h'_0, h'_1, h'_2, h'_3]$ is the matrix of size N×N whose columns correspond to the impulse response vectors $h'_i$ associated with the respective propagation channels between the N antennas 15 of the base station and the mobile terminal.

This covariance matrix K' is not accessible to the mobile terminal, which is unaware of the manipulations performed by the control module 42. The matrix K of size M×M, estimated by the module 32 of the mobile terminal, has the following expression:

$$K = \begin{bmatrix} x & z \\ z^* & y \end{bmatrix} \quad (1)$$

where $x = a^H.K'.a$ and $y = b^H.K'.b$ are positive real numbers and $z = a^H.K'.b$ is a complex number.

The normalized eigenvector g associated with the eigenvalue of maximum modulus of this matrix K has the following expression:

$$g = \frac{1}{S}\begin{bmatrix} z/x \\ \frac{(y/x)-1}{2} + \sqrt{\left(\frac{(y/x)-1}{2}\right)^2 + \left|\frac{z}{x}\right|^2} \end{bmatrix} = \frac{1}{2S}\begin{bmatrix} 2\lambda_1 \\ \lambda_2 + \sqrt{\lambda_2^2 + |2\lambda_1|^2} \end{bmatrix} \quad (2)$$

where S is a normalization factor, $\lambda_1 = z/x$ and $\lambda_2 = (y/x)-1$.

Each time the complete feedback data are returned by the terminal for a combination (a, b), the control module 42 of the base station thus obtains the direction of the vector g as given by the ratio $$t = \frac{2\lambda_1}{\lambda_2 + \sqrt{\lambda_2^2 + |2\lambda_1|^2}},$$

that is to say a relation between the quantities z/x and y/x which depend on the components of the matrix K'. This relation is approximate in view of the matrix K estimation errors by the terminal and of the quantization which it carries out on the vector g before transmitting it.

The matrix K' has N(N+1)/2 independent terms since $k'_{ji} = k'_{ij}$ for $0 \le i < j < N$. Given that the module 42 simply has to identify an eigenvector of maximum modulus of K', these terms can be expressed proportionally to one of them, for example $k'_{00}$. Thus, (N−1)(N+2)/2 suitable chosen combinations (a, b) enable the module 42 to estimate a matrix K" proportional to K', and hence to calculate its normalized eigenvector W associated with the eigenvalue of maximum modulus. Hence, 9 combinations (a, b) are sufficient when N=4.

There are numerous ways of choosing these combinations (a, b). Moreover, the number of combinations can be increased and the matrix K" can be estimated according to the maximum likelihood. Each time a vector g is recovered by the base station for a combination of distribution vectors a, b, the control module 42 can thus update the matrix K" through an interpolation calculation, thereby enabling it to adapt more rapidly to the variations in the channel and to reduce the incidence of the errors of quantization of the vectors g by the terminal.

One possibility is to take, for $0 \le i < j < N$, two combinations of the form $a_i = \alpha$ (with $a_{i'} = 0$ for $i' \ne i$) and $b_j = \beta$ (with $b_{j'} = 0$ for $j' \ne j$), where $|\alpha|^2 + |\beta|^2 = 1$, $\alpha \ne 0$, $\beta = 0$ and $|\alpha| \ne |\beta|$. The feedback data returned by the mobile terminal then give an indication of the direction defined by $$t = \frac{2\frac{\beta}{\alpha} \cdot \frac{k'_{ij}}{k'_{ii}}}{\left|\frac{\beta}{\alpha}\right|^2 \cdot \frac{k'_{jj}}{k'_{ii}} - 1 + \sqrt{\left(\left|\frac{\beta}{\alpha}\right|^2 \cdot \frac{k'_{jj}}{k'_{ii}} - 1\right)^2 + \left|2\frac{\beta}{\alpha} \cdot \frac{k'_{ij}}{k'_{ii}}\right|^2}}.$$

The two different choices of the ratio β/α thus make it possible to calculate the ratios $k'_{jj}/k'_{ii}$ and $k'_{ij}/k'_{ii}$. For N=4, M=2, nine combinations of this type make it possible to construct the matrix K" proportional to K' and hence to estimate the weighting coefficients $w_0$–$w_3$. The latter can be obtained by diagonalizing the matrix K" or by selecting a normalized vector W from a distinct set in such a way as to maximize $W^H.K''.W$.

The method set forth requires a time of the order of 9-fold the time required for the acquisition of a feedback data set, during which the characteristics of the channel should not vary too much. It will therefore be applied essentially to slow mobile terminals. The latter can be detected in a known manner by estimation of speed on the basis of observing the radio signals received by the base station. The method can also be applied systematically in cells where it is known that the terminals are almost always static or slow (for example inside certain buildings).

We claim:

1. A method for controlling transmission from a first radio station having N transmission antennas to a second radio station, N being a number larger than 2, comprising the following steps:

broadcasting M beacon signals from the first station, M being a number larger than 1 and smaller than N, each beacon signal being associated with a distribution vector with N components and being applied to each of the N antennas after weighting by a corresponding component of the associated distributor vector;

evaluating the reception of the M beacon signals by the second station, so as to determine feedback data communicated to the first station;

causing the distribution vectors associated with the M beacon signals to vary over time;

processing the feedback data successively received by the first station so as to determine a respective weighting coefficient for each of the N antennas; and transmitting a dedicated radio signal from the first station destined for the second station, the said dedicated signal being applied to each of the N transmission antennas after weighting by the coefficient determined for the said antenna.

2. A method as claimed in claim 1, wherein the processing of the feedback data comprises an estimation of a matrix with N rows and N columns on the basis of feedback data obtained for several combinations of distribution vectors, the term situated in the (i+1)-th and in the (j+1)-th column of the said matrix, for $0 \leq i < N$ and $0 \leq j < N$, being proportional to $h'^H_j . h'_i$, where $h'_i$ denotes an impulse response of a propagation channel between the (i+1)-th transmission antenna of the first station and the second station, and $(.)^H$ denotes the conjugate transpose.

3. A method as claimed in claim 2, wherein the processing of the feedback data comprises the calculation of an eigenvector corresponding to an eigenvalue of maximum modulus of the said matrix with N rows and N columns, the respective weighting coefficients for the N antennas being proportional to the components of the said eigenvector.

4. A method as claimed in claim 2, wherein the said matrix with N rows and N columns is estimated on the basis of the feedback data obtained for $(N-1)(N+2)/2$ distinct successive combinations of distribution vectors.

5. A method as claimed in claim 2, wherein the estimation of the said matrix with N rows and N columns comprises an updating of the said matrix by interpolation on the basis of the feedback data obtained for each combination of distribution vectors.

6. A method as claimed in claim 1, wherein each distribution vector associated with a beacon signal has a single nonzero component.

7. Radio station with closed-loop transmission diversity, comprising N transmission antennas, N being a number larger than 1, and comprising
    means for broadcasting M beacon signals, M being a number larger than 1, said means for broadcasting comprising means for associating each of the M beacon signals with a respective distribution vector with N components, and means for applying each of the M beacon signals to each of the N antennas after weighting by a corresponding component of the associated distribution vector,
    means for transmitting at least one dedicated radio signal destined for a respective remote radio station, said means for transmitting the dedicated radio signal destined for a remote radio station comprising means for processing feedback data received from the said remote station so as to determine a respective weighting coefficient for each of the N antennas, and means for applying the said dedicated signal to each of the N transmission antennas after weighting by the coefficient determined for the said antenna,
wherein N>M, wherein the broadcasting means furthermore comprise means for causing the distribution vectors associated with the M beacon signals to vary over time, and wherein the processing means are devised so as to determine the respective weighting coefficients for the N antennas on the basis of feedback data successively received for different combinations of distribution vectors.

8. Radio station as claimed in claim 7, wherein the means for processing the feedback data comprise means for estimating a matrix with N rows and N columns on the basis of feedback data obtained for several combinations of distribution vectors, the term situated in the (i+1)-th and in the (j+1)-th column of the said matrix, for $0 \leq i < N$ and $0 \leq j < N$, being proportional to $h'^H_j . h'_i$, where $h'_i$ denotes an impulse response of a propagation channel between the (i+1)-th transmission antenna of the first station and the second station, and $(.)^H$ denotes the conjugate transpose.

9. Radio station as claimed in claim 8, wherein the means for processing the feedback data comprise means for calculating an eigenvector corresponding to an eigenvalue of maximum modulus of the said matrix with N rows and N columns, the respective weighting coefficients for the N antennas being proportional to the components of the said eigenvector.

10. Radio station as claimed in claim 8, wherein the means for estimating the matrix with N rows and N columns comprise means of interpolation for updating of the said matrix on the basis of the feedback data obtained for each combination of distribution vectors.

11. Radio station as claimed in claim 7, wherein each distribution vector associated with a beacon signal has a single nonzero component.

12. Radio station as claimed in claim 7, wherein N=4 and M=2.

* * * * *